United States Patent
Cyron et al.

(10) Patent No.: US 12,423,811 B2
(45) Date of Patent: Sep. 23, 2025

(54) SYSTEM FOR DETERMING MECHANICAL TISSUE CHARACTERISTICS FROM IMAGING DATA

(71) Applicants: Helmholtz-Zentrum hereon GmbH, Geesthacht (DE); Technische Universität Hamburg (TUHH), Hamburg (DE)

(72) Inventors: Christian Cyron, Reinbek (DE); Kevin Linka, Hamburg (DE); Sven Nebelung, Aachen (DE)

(73) Assignees: Helmholtz-Zentrum hereon GmbH, Geesthacht (DE); Technische Universität Hamburg (TUHH), Hamburg (DE)

( * ) Notice: Subject to any disclaimer, the term of this patent is extended or adjusted under 35 U.S.C. 154(b) by 424 days.

(21) Appl. No.: 18/116,997

(22) Filed: Mar. 3, 2023

(65) Prior Publication Data
US 2023/0281808 A1 Sep. 7, 2023

(30) Foreign Application Priority Data
Mar. 4, 2022 (EP) .................................... 22160216

(51) Int. Cl.
*G06T 7/00* (2017.01)
(52) U.S. Cl.
CPC .. *G06T 7/0012* (2013.01); *G06T 2207/20081* (2013.01); *G06T 2207/30004* (2013.01)

(58) Field of Classification Search
CPC ........ A61B 2034/105; A61B 1/000096; G06T 2207/20081; G06T 2207/30004; G06T 7/0012
See application file for complete search history.

(56) References Cited

U.S. PATENT DOCUMENTS

2020/0341098 A1* 10/2020 Murphy ............. G01R 33/5608
2022/0104794 A1* 4/2022 De Beni .............. A61B 8/5253
(Continued)

OTHER PUBLICATIONS

Brattain, L., et al., "Objective Liver Fibrosis Estimation from Shear Wave Elastography", IEEE, 2018, pp. 3472-3476.
(Continued)

*Primary Examiner* — Gerald Johnson
(74) *Attorney, Agent, or Firm* — Lowe Graham Jones PLLC; Ellen M. Bierman (57) ABSTRACT

A system and methods for determining a mechanical tissue characteristic ($\Psi$) are provided. The system comprises a providing unit for providing a set of images of a tissue region of interest, wherein the provided set of images comprises image features indicative of one or more structural properties ($\alpha$, $a_0$, CO, PG) of the tissue region of interest and has been acquired using an imaging modality suitable for in-vivo imaging of the tissue region of interest. The system further comprises a determining unit for determining, based on the provided set of images, a mechanical tissue characteristic ($\Psi$) indicative of a mechanical responsiveness of the tissue region of interest. The determining unit comprises a machine learning architecture adapted to receive the provided set of images as an input and to provide the mechanical tissue characteristic as an output.

14 Claims, 6 Drawing Sheets

(56) References Cited

U.S. PATENT DOCUMENTS

2023/0397816 A1* 12/2023 Forneris ................ G06T 7/0012
2024/0237965 A1*  7/2024 Xu ...................... A61B 8/4488

OTHER PUBLICATIONS

Kissas, G., et al., "Machine Learning in Cardiovascular Flows Modeling: Predicting Arterial Blood Pressure from Non-Invasive 4D Flow MRI Data Using Physics-Informed Neural Networks", Computer Methods in Applied Mechanics and Engineering, vol. 358, Sep. 17, 2019, 28 pages.

Li, H., et al., "DeepLiverNet: a Deep Transfer Learning Model for Classifying Liver Stiffness Using Clinical and T2-Weighted Magnetic Resonance Imaging Data in Children and Young Adults", Pediatric Radiology, vol. 51, No. 3, Oct. 13, 2020, pp. 392-402.

Linka, K., et al., "Machine Learning-Augmented and Microspectroscopy-Informed Multiparametric MRI for the Non-Invasive Prediction of Articular Cartilage Composition", Osteoarthritis and Cartilage, vol. 29, No. 4, Feb. 2, 2021, pp. 592-602.

Linka, K., et al., "Predicting and Understanding Age-Dependent Arterial Elasticity from Key Microstructural Features by Bidirectional Deep Learning", Acta Biomaterialia, Jan. 17, 2022.

European Search Report issued in European Application No. 22160216.2 by the European Patent Office on Aug. 26, 2022.

\* cited by examiner

SYSTEM FOR DETERMINING MECHANICAL TISSUE CHARACTERISTICS FROM IMAGING DATA

CROSS-REFERENCE TO RELATED APPLICATIONS

This application claims the benefit of European Application No. 22160216.2, entitled "System for Determining Mechanical Tissue Characteristics from Imaging Data," filed Mar. 4, 2022 which applications are incorporated herein by reference in their entireties.

TECHNICAL FIELD

The present disclosure relates to a system and a method for determining a mechanical tissue characteristic, particularly a mechanical characteristic of biological tissue, and to a corresponding computer program. The present disclosure also relates to a method of training the system, and to the system resulting from the training.

BACKGROUND

In order to assess a state of tissue, mechanical tissue characteristics serving as an indicator for the tissue state may be determined. In clinical practice, for instance, clinical states of human body tissue can be inferred from mechanical tissue characteristics determined in mechanical examinations. However, such mechanical examinations often need to be invasive. Invasive procedures are, on the other hand, generally to be avoided, since they bear the risk of surgical and anesthetic complications. Thus, non-invasive imaging-based procedures such as classical elastography are often preferable. Classical elastography has, however, important limitations. In particular, it typically provides only insufficient information when applied to relatively stiff tissues such as cartilage since the mechanical excitations inducible therein by sound waves are relatively small. Therefore, classical elastography is typically not applied for assessing, for example, the risk that a patient develops osteoarthritis in the knee. More intensive mechanical probing of, for example, the knee cartilage is possible during an arthroscopy, but, due to its invasive character and the corresponding risks involved, arthroscopy is usually not carried out only for the purpose of assessing the risk that a patient develops osteoarthritis in the knee. There is therefore a need for accurate non-invasive means for determining a mechanical tissue characteristic based on which a tissue state can be assessed.

BRIEF DESCRIPTION OF THE DRAWINGS

FIG. 5 shows schematically and exemplarily, in FIGS. 5(a), 5(b), 5(d) and 5(e), different types of MR images of a tissue sample and, in FIGS. 5(c) and 5(f), staining images of the tissue sample for histological analysis.

DETAILED DESCRIPTION

Improvements described here provide accurate non-invasive means for determining a mechanical tissue characteristic based on which a tissue state can be assessed.

In a first aspect, a system for determining a mechanical tissue characteristic is provided, the system comprising:
a providing unit that provides a set of images of a tissue region of interest, wherein the provided set of images comprises image features indicative of one or more structural properties of the tissue region of interest and has been acquired using an imaging modality suitable for in-vivo imaging of the tissue region of interest, and
a determining unit that determines, based on the provided set of images, a mechanical tissue characteristic indicative of a mechanical responsiveness of the tissue region of interest, wherein the determining unit comprises a machine learning architecture adapted to receive the provided set of images as an input and to provide the mechanical tissue characteristic as an output.

Since the mechanical tissue characteristic is determined by the determining unit based on a provided set of images of the tissue region of interest that has been acquired using an imaging modality suitable for in-vivo imaging of the tissue region of interest, wherein the determining unit comprises a machine learning architecture adapted to receive the provided set of images as an input and to provide the mechanical tissue characteristic as an output, the tissue characteristic can be determined non-invasively. Moreover, since the provided set of images comprises image features indicative of structural properties of the tissue region of interest, the machine learning architecture can provide the mechanical tissue characteristics based on the structural properties, which allows for an accurate determination of the mechanical tissue characteristic. Based on the mechanical tissue characteristic, an accurate assessment of the state of the tissue region of interest can be achieved, since the mechanical tissue characteristic is indicative of a mechanical responsiveness of the tissue region of interest and therefore particularly suitable as an indicator for the tissue state.

The system is suitable for determining a mechanical tissue characteristic. A mechanical tissue characteristic is understood herein as referring to one or more quantities indicative of a mechanical responsiveness of the tissue region of interest, particularly a mechanical responsiveness of the tissue region of interest to mechanical conditions. A mechanical condition of a tissue region is preferably understood herein as referring to a condition or state of the tissue region that could be described by means of mechanics. For instance, a mechanical condition of a tissue region can comprise a mechanical loading on and/or a deformation of the tissue region. The tissue is preferably biological tissue.

Based on the mechanical tissue characteristic, a tissue state can be assessed. As the tissue state can be assessed based on the determined mechanical tissue characteristic, the system may also be considered being a system for assessing a tissue state. In fact, as also described in more detail further below, the system can further comprise an assessing unit that is adapted to use the determined mechanical tissue characteristic to assess a tissue state. The tissue state to be assessed preferably refers to a state of biological tissue, such as a clinical state of the tissue, for instance, wherein assessing the tissue state can correspond to a diagnosis. The tissue region of interest can refer to a region in the tissue to be assessed, such as a region of particular medical concern, or to the whole tissue to be assessed.

The providing unit is adapted to provide a set of images of a tissue region of interest. This set of images will often consist of a plurality of images, but can, in some embodiments, consist of only a single image. Only a single image may be sufficient, for instance, if the image is a photoacoustic image, since a single photoacoustic image can comprise sufficient information for determining the mechanical tissue characteristic. The one or more images in the provided set of images comprise image features which are indicative of one or more structural properties of the tissue region of interest. Structural properties of the tissue region of interest are understood herein as properties referring to a structure of the region of interest, particularly its structural composition, i.e. particularly to a density and/or distribution of its constituents. For instance, the structural properties may refer to the materials and/or substances contained in the tissue region of interest, i.e. to its constituents, and/or to a microstructure and/or a micro-composition of the tissue region of interest.

The set of images of the tissue region of interest is preferably acquired using an imaging modality which is sensitive to structural properties, i.e. adapted to generate images indicative of structural properties of an imaged object. Magnetic resonance imaging (MRI) is one example of such an imaging modality since it can be controlled according to predefined sequences. Sequences refer to the specific settings of the MRI scanner that result in specific image appearances and contrasts based on commonly used image acquisition and processing techniques. Different sequences can lead to different image appearances and contrasts that can be indicative of certain structural properties of an imaged object. The images can indicate the structural properties, for instance, in terms of different pixel values, such as color or gray values, although the underlying geometry of the imaged objects may be the same. Generally, the provided set of images can comprise, for example, quantitative, anatomical and/or morphologic MR image data as well as photoacoustic image data. Particular MR sequences to generate images of variable image appearance and contrast that are indicative of structural properties are, for instance, T1-, T1$\rho$-, T2- and/or T2*-mapping sequences to generate T1-, T1$\rho$-, T2- and/or T2*-maps. Herein, morphologic MRI refers to MR image acquisition and post-processing techniques that primarily convey information on the morphology, defined as form and structure, of a particular anatomic structure, tissue, or organ. Hence, morphological MR image data as referred to herein can be understood as image data conveying information on the morphology, defined as form and structure, of a particular anatomic structure, tissue, or organ. MR images generated with morphologic MRI sequences may also comprise quantitative information, such as in the form of their pixel intensities (analogously to Hounsfield units in computed tomography imaging). Depending on the sequence, different tissues (and their states) may be distinguishable from each other in terms of "brightness" in a respective image. The pixel intensities in morphologic MRI data can, however, depend on a plurality of conditions, such as the particular MRI sequence, the MRI scanner, the patient, et cetera, and may therefore not be comparable, particularly between individuals. With quantitative MRI sequences, MR images can be generated that are intra-individually and inter-individually comparable.

That the imaging modality used for acquiring the set of images is suitable for in-vivo imaging of the tissue region of interest preferably means that it can be used for imaging the tissue region of interest in its natural environment. In particular, if the tissue is biological tissue of an organism, particularly a human patient, for instance, in-vivo imaging of the tissue region of interest refers to imaging the tissue region of interest inside the organism, particularly while the organism is alive. Using an imaging modality suitable for in-vivo imaging of the tissue region of interest allows for determining its tissue characteristic and therefore possibly also its tissue state in clinical practice. It is understood that an imaging modality that is suitable for in-vivo imaging of the tissue region of interest can also be used for non-in-vivo imaging, such as in-vitro or ex-vivo imaging, which might be applied for imaging tissue samples for acquiring training data used for training the machine learning architecture of the determining unit, as will be described in more detail further below. Exemplary imaging modalities that can be used for acquiring the images of the tissue region of interest are, as already indicated above, MRI and photoacoustic imaging. Imaging modalities that are not suitable for in-vivo imaging of the tissue region of interest include those which rely on taking a tissue sample and possibly require a further preparation of the tissue sample, such as by a chemical treatment, before imaging. Such imaging modalities may be considered in-vitro imaging modalities as opposed to in-vivo imaging modalities.

The provided set of images can show the tissue region of interest in one or more mechanical conditions, wherein the one or more mechanical conditions preferably refer to a respective mechanical load on the tissue region of interest and/or a respective deformation of the tissue region of interest, wherein the respective mechanical load and/or the respective deformation may be static, i.e. not a mere excitation by, for instance, a sound wave. Hence, the tissue in each image in the set of images is preferably associated with certain information about mechanical conditions such as, for instance, mechanical loading conditions and/or a deformation, which may be provided by the providing unit together with the set of images. In some embodiments, the determining unit may be provided not only the set of images as input, but additionally also information about the loading conditions and/or deformation associated with each image. The one or more mechanical conditions can refer, for instance, to a normal or equilibrium state or to a state free from external action upon the tissue, wherein particularly the mechanical loading and/or deformation associated with an image can be zero. In other cases, the one or more mechanical conditions can refer, for instance, to an abnormal or non-equilibrium state or to a state with non-vanishing external action upon the tissue, wherein particularly the mechanical loading and/or deformation associated with an image may be different from zero. In an exemplary embodiment, one may use a mechanical device that generates a configurable mechanical condition, particularly a configurable loading condition and/or deformation, for a tissue region of interest in a patient during an ongoing medical imaging exam, such as an MRI scan of the patient. Generating the mechanical condition can refer, for instance, to exerting a force, a pressure, a torque, a stress, a tension, et cetera, on the tissue region of interest, which can generate a deformation of the tissue region of interest. A deformation can be understood in terms of any measure of deformation, i.e., for instance, in terms of a function mapping material points from a given reference configuration to their current configuration, a displacement between both, or also any local measure such as a strain or a deformation tensor such as the Cauchy-Green deformation tensor.

The determining unit is adapted to determine, based on the provided set of images, a mechanical tissue characteristic indicative of a mechanical responsiveness of the tissue region of interest, wherein the determining unit comprises a machine learning architecture adapted to receive the provided set of images as an input and to provide the tissue characteristic as an output. Hence, the determining unit is adapted to determine the tissue characteristic by use of the machine learning architecture, such that also the machine learning architecture can be regarded as being adapted to determine the mechanical tissue characteristic, namely as its output, based on the provided set of images, namely its input. In some embodiments, the determining unit may be identified with the machine learning architecture. The machine learning architecture can, for instance, comprise an artificial neural network comprising an input layer, a plurality of hidden layers and an output layer. Machine learning architectures will be described further below.

That the determined mechanical tissue characteristic is indicative of a mechanical responsiveness means that it can be determined without reference to, i.e. independently of an actual mechanical response. It is therefore not necessary that a particular mechanical condition of the imaged tissue region is generated for imaging, such as by exerting a mechanical force, generating a deformation or inducing an excitation, to which then a mechanical response could be measured, for instance. Moreover, in this way, general, particularly non-linear, mechanical characteristics, such as a strain energy function, can be determined even if only a linear response to an exerted mechanical force, generated deformation or induced excitation could be observed. This is in contrast to classical elastography, where only linear mechanical properties, such as the tangential stiffness (Young's modulus) can be determined due to the limited mechanical excitations inducible by sound waves. In fact, a difference to classical elastography is already that no excitations need to be generated in the tissue region of interest at all for determining the mechanical tissue characteristic.

On the other hand, if the images of the tissue region of interest are acquired such that the tissue region of interest is in a mechanical condition referring to a respective non-zero mechanical load on the tissue region of interest and/or a non-zero respective deformation of the tissue region of interest, the respective mechanical load and/or deformation may go beyond a linear regime, i.e., for instance, such that the behavior of the tissue can no longer be described by linear mechanics. In particular, the one or more mechanical conditions of the imaged tissue region of interest may not be inducible by excitation using sound waves.

The determining unit is preferably adapted to determine the mechanical tissue characteristic based particularly on the image features indicative of the one or more structural properties of the tissue region of interest, which the provided set of images of the tissue region of interest comprises. Correspondingly, the machine learning architecture is preferably adapted to particularly receive the image features indicative of the one or more structural properties of the tissue region of interest as input. In fact, in some embodiments, the determining unit is adapted to determine the mechanical tissue characteristic based only on the image features indicative of the one or more structural properties of the tissue region of interest, wherein the image features may previously be extracted from the provided set of images. Likewise, the machine learning architecture can be adapted to receive only the image features indicative of the one or more structural properties of the tissue region of interest as input, wherein the image features may previously be extracted from the provided set of images.

The determining unit can, in particular, be adapted to determine, based on the provided set of images, a plurality of mechanical tissue characteristics indicative of a mechanical responsiveness of the tissue region of interest, wherein the mechanical tissue characteristics may comprise a mechanical tissue characteristic indicative of one or more elastic properties of the tissue region of interest, and a mechanical tissue characteristic indicative of one or more inelastic properties of the tissue region of interest. The elastic properties may involve an elastic response. The inelastic properties may involve, for example, viscoelastic or plastic properties, where the mechanical response may depend on the loading history and may be a function also of time, or also electromechanical properties, which may particularly be preferred in case the tissue region of interest comprises muscle tissue.

The determined mechanical tissue characteristic is indicative of a mechanical responsiveness of the tissue region of interest. The mechanical responsiveness of the tissue region of interest can, for instance, be measured in terms of a mechanical response and/or a mechanical responsiveness of the tissue region of interest to being set in one or more predefined mechanical conditions, wherein the one or more predefined mechanical conditions may refer to any general mechanical condition or to one or more specific mechanical conditions in which the tissue region of interest was at the time the provided set of images was acquired. Thus, in particular, the mechanical responsiveness of the tissue region of interest may refer not only a) to a mechanical loading and/or deformation to which the tissue region of interest was subject at the time the provided set of images was acquired, but additionally or alternatively also b) to mechanical loading and/or deformation of the tissue region of interest in general. Hence, for instance, the mechanical responsiveness can refer to an elasticity, a viscoelasticity, a poroelasticity, a plasticity, a stiffness, a stability, a strength, a resistance, et cetera. The mechanical tissue characteristic being indicative of the mechanical responsiveness preferably refers to one or more quantities derivable from the mechanical responsiveness or from which the mechanical responsiveness can be derived. While the mechanical responsiveness might need to be measured in terms of directional quantities, such as vectors and tensors, for instance, the mechanical tissue characteristic can be a scalar-valued quantity or function, such as a strain energy, for instance. Both the mechanical responsiveness and the tissue characteristic can be local quantities, i.e. can be determined depending on the position in the tissue region of interest or in one or more of the set of images thereof.

The set of images is preferably acquired using an imaging modality that is sensitive to the mechanical responsiveness of the tissue region of interest. An imaging modality can already be understood as being sensitive to the mechanical responsiveness of an imaged object like the tissue region of interest if it is sensitive to other properties of the imaged object that influence or determine the mechanical responsiveness. Such other properties can be structural properties, for instance. Hence, the provided set of images can not only carry geometric information, but also information about the structural properties of the tissue. This is due to the specific appearance of different tissue constituents under certain imaging modalities such as quantitative magnetic resonance imaging (qMRI), photoacoustic imaging or also other imaging modalities. As the mechanical tissue characteristic will depend in some way on the structural properties of the tissue, an appropriate set of images carrying sufficient information about these structural properties, particularly acquired with an appropriate imaging modality, can be used to determine the mechanical tissue characteristic.

Since the determining unit comprises the machine learning architecture for determining the mechanical tissue characteristic based on the provided set of images, image data can enter the determination based on which no analytic model could be formed. The limitations of analytic models allowing to infer mechanical tissue characteristics from image data are known from classical elastography, for instance, where only linear mechanical properties can be determined.

In one embodiment, the determining unit is adapted to determine, based on the provided set of images, the one or more structural properties of the tissue region of interest as an intermediate result provided by the machine learning architecture, and to determine the mechanical tissue characteristic based on the one or more structural properties. The provided set of images is then preferably acquired using an imaging modality that is sensitive to the one or more structural properties of the tissue region of interest. The structural properties can refer to a structural composition of the tissue region of interest, i.e. to a density and/or distribution of constituents of the tissue region of interest. Particularly if the constituents exhibit a directionality, such as constituents comprising elongated molecules or molecule complexes, the structural properties can also refer to an anisotropy of the tissue region of interest, for instance. The structural properties can be determined locally, i.e. depending on the position in the tissue region of interest or in an image thereof. In an embodiment, the machine learning architecture can comprise a first part, which may be viewed as a machine learning architecture on its own, wherein this first part is adapted to determine the one or more structural properties of the tissue region of interest being an intermediate result as its output based on the set of images provided as its input, wherein a further part of the machine learning architecture is adapted to determine, as its output, the one or more tissue characteristics based on the one or more structural properties received as its input.

In one embodiment, the determining unit receives only the set of images from the providing unit, since it may be adapted, i.e. via suitable machine learning/training, for instance, to derive, based on the set of images of the tissue region of interest received as an input, the one or more structural properties of the tissue region of interest and/or the mechanical tissue characteristic without reference, particularly without explicit reference, to any mechanical condition of the tissue region of interest, i.e., for instance, any loading condition and/or deformation.

On the other hand, in some embodiments, the machine learning architecture is adapted to receive, as a further input, information about a respective mechanical condition of the tissue region of interest in the provided set of images, wherein the determining unit is adapted to determine the structural properties and/or the mechanical tissue characteristic based further on this information. These embodiments can also be viewed such that the determining unit is adapted to determine the structural properties and/or the one or more mechanical tissue characteristics based on the set of images provided by the providing unit and based further on the mechanical conditions of the tissue region of interest in the provided set of images, which are received by the determining unit as a further input. Also this further input may be provided by the providing unit, which is to say that the providing unit may be adapted to provide the information about the respective mechanical conditions of the tissue region of interest in the provided set of images. In particular, the respective mechanical conditions of the tissue region of interest in the provided set of images may be used by the determining unit, and specifically the machine learning architecture, in determining the structural properties of the tissue region of interest as an intermediate result and/or in determining the one or more mechanical tissue characteristics.

In an example, the determining unit is adapted to determine, based on the structural properties of the tissue region of interest and possibly also its one or more mechanical conditions in the set of images provided, a single mechanical tissue characteristic, such as a strain energy, indicative of a mechanical responsiveness of the tissue region of interest to mechanical conditions such as mechanical loading and/or deformation. Further mechanical tissue characteristics, such as stresses as functions of deformation or strain, indicative of a respective responsiveness of the tissue region of interest to mechanical conditions such as a loading and/or deformation, can then be derived, possibly using the respectively determined structural properties and/or the determined single mechanical tissue characteristic indicative of a mechanical responsiveness of the tissue region of interest to mechanical conditions such as mechanical loading and/or deformation.

More specifically, the machine learning architecture may be adapted to determine, such as via the first part of the machine learning architecture, the one or more structural properties of the tissue region of interest as an intermediate result and to provide, such as via a further part of the machine learning architecture, based on the intermediate result and possibly further based on information about the mechanical conditions of the tissue region of interest in the set of images provided, particularly loading conditions and/or deformations, one or more mechanical tissue characteristics. The structural properties determined as intermediate result may be further processed by the machine learning architecture at least partially in terms of quantities derived from the structural properties according to an analytic model of the tissue to be assessed, particularly the tissue region of interest. In this way, the machine learning architecture can be adapted to the particular task of deriving a mechanical tissue characteristic indicative of a mechanical responsiveness for the particular tissue to be assessed based on corresponding image(s) in a way that allows for a particularly efficient training of the machine learning architecture and a particularly accurate determination of mechanical tissue characteristics.

In one example embodiment, the machine learning architecture implements a nonlinear model functionally relating a part or all of its input to its output. In fact, the machine learning architecture can implement a nonlinear model functionally relating mechanical loading and/or deformation of the tissue region of interest to a respective mechanical response. The model may, in an example, be characterized by a single function indicative of a responsiveness of the tissue region of interest to mechanical loading and/or deformation. The function may be parameterized, at least in part, by the structural properties of the region of interest.

In one example embodiment, the nonlinear model implemented by the machine learning architecture is a mechanical constitutive model relating mechanical strain and mechanical stress to each other. The constitutive model can, in particular, be a hyperelastic constitutive model. A constitutive model, which refers herein to a mechanical constitutive model, is preferably understood herein as a hyperelastic constitutive model if it assumes ideal elasticity and/or if the relation between strain and stress can be derived from a strain energy density function. The constitutive model or the machine learning architecture implementing it can, in particular, be adapted to use the set of images provided by the providing unit, and possibly also information about the one or more mechanical conditions of the respectively imaged tissue region of interest, for determining model parameters of the constitutive model.

The machine learning architecture comprises, in an example embodiment, a constitutive artificial neural network suitable for machine learning. In an embodiment, the constitutive model is based on a constitutive artificial neural network. However, in the same or another embodiment, the constitutive artificial neural network may also be regarded as being structured based on the constitutive model. The machine learning may refer to supervised machine learning. In fact, a constitutive artificial neural network could generally be understood herein as an artificial neural network that is adapted to receive strain data as its input and to provide stress data as its output.

In some embodiments, the constitutive artificial neural network can particularly have a structure as described in the article "Constitutive artificial neural networks: a fast and general approach to predictive data-driven constitutive modeling by deep learning" by K. Linka et al., *Journal of Computational Physics*, Vol. 429 (2021). In such embodiments, the constitutive artificial neural network accepts as an input imaging data or information derived therefrom as well as strain data in form of the Cauchy-Green tensor C. As described in the mentioned article, this input may then be processed by a set of subunits comprised by the constitutive artificial neural network, which can be analytical equations or artificial neural networks. The trained neural network can provide—for given imaging data or information derived therefrom—for each value of C a corresponding strain energy $\Psi$, and thereby a particular mechanical tissue characteristic that characterizes the mechanical response of the tissue to a variety of mechanical conditions.

Constitutive artificial neural networks do not assume a specific functional form for the strain energy a priori as analytical constitutive equations do. On the other hand, constitutive artificial neural networks do also not start into learning the constitutive properties of a material without any prior knowledge as standard artificial neural networks would do and as would require excessive amounts of training data. Rather, constitutive artificial neural networks can incorporate prior knowledge from materials theory while leaving the underlying material-specific functional relations open to be learned from specific material data. This way, constitutive artificial neural networks can be highly general while incorporating at the same time theoretical prior knowledge, which allows for a reduction of the amount of training data required for learning the constitutive behavior of a specific material significantly.

In a some embodiments, the mechanical condition is represented in terms of the Cauchy-Green deformation tensor C and the mechanical tissue characteristic is represented in terms of a strain energy function $\Psi$ or any quantity that can directly be derived from it and/or depends (particularly only) on it, particularly a quantity that can be derived from $\omega$ by algebraic and/or analytic means without further information about the tissue region of interest. Such a quantity can be a stress, for instance. For instance, the $2^{nd}$ Piola-Kirchhoff stress S can be used. Assuming a nonlinear anisotropic hyperelastic constitutive model, the stress tensor S can then be derived from the strain energy $\Psi$ as $S=2\partial\Psi/\partial C$. Being a scalar function, $\Psi$ can, for example, be written in terms of the following (generalized) invariants of C:

$$\tilde{I} = tr[C\tilde{L}], \quad \tilde{J} = tr[cof(C)\tilde{L}], \quad III_c = \det C, \tag{1}$$

wherein tr denotes the trace of a tensor like C, cof its cofactor and det its determinant, and wherein $\tilde{L}$ refers to a generalized structure tensor. For cartilage, often $$\tilde{L} = \frac{a_0}{3}I + (1-a_0)L, \quad L = M \otimes M \tag{2}$$

can be assumed, wherein $a_0$ is the local anisotropy and M a local unit direction vector that can be computed from the collagen fiber orientation angle $\alpha$ by assuming rotational symmetry for the collagen fibers.

In an example embodiment, the machine learning architecture has been trained using training data comprising a) training input data and b) training output data associated with the training input data, wherein the training data have been acquired by:

acquiring, as training input data, images of a plurality of tissue samples, the images comprising image features indicative of one or more structural properties of the imaged tissue samples, and determining, as training output data, the mechanical tissue characteristic for each of the tissue samples.

It is understood that the tissue samples are preferably of the same type as the tissue whose mechanical tissue characteristics are to be determined (and possibly whose state is to be assessed). The images acquired as training input data are preferably of the same type as the set of images provided by the providing unit. In particular, the images acquired as training input data can also have been acquired using an imaging modality suitable for in-vivo imaging of the tissue region of interest, specifically the same type of or even the same imaging modality as the one used for acquiring the images of the tissue region of interest provided by the providing unit. The one or more tissue characteristics determined for acquiring the training output data are preferably the one or more mechanical tissue characteristics to be determined by the (trained) machine learning architecture. Moreover, it is understood that the images of the plurality of tissue samples may not be the only acquired training input data, and that the determined mechanical tissue characteristics may not be the only training output data. The image features comprised by the images of the tissue samples acquired as training input data are preferably of the same type as, or correspond to, the image features comprised by the set of images of the tissue region of interest provided by the providing unit, i.e. are particularly indicative of the same type of, or corresponding, structural properties.

The mechanical tissue characteristics used as training output data are preferably measured. In an embodiment, the one or more mechanical tissue characteristics determined as training output data can be determined from a biomechanical analysis involving biomechanical tests, particularly from uni- or equibiaxial tension tests and compression tests. These tests may measure the immediate mechanical response of the tissue to loading but also other types of tissue behavior such as stress relaxation.

In an embodiment, the respective mechanical condition, i.e., for instance, the respective mechanical loading condition and/or deformation, is generated by a corresponding force or surface load on the tissue samples in a predefined direction. The force or surface load can correspond to a predefined pressure applied by a piston, for instance. For generating the respective mechanical conditions of the tissue samples, a mechanical device can be used that exerts a configurable mechanical load on a tissue sample, particularly a tissue region in the tissue sample. The two mechanical loading devices used for generating the mechanical loading conditions of the tissue region of interest and of the tissue samples used for training can be adapted such that they can generate corresponding, particularly the same, mechanical conditions.

In an example embodiment, the training data further comprise intermediate result training data acquired by determining, as intermediate result training data, the one or more structural properties for each of the tissue samples based on reference evaluations of the structural properties of the tissue samples. The reference evaluations refer to reference measurements resulting in reference measurement data indicative of the structural properties of the tissue samples. The reference measurements yielding the reference measurement data can in particular comprise histological, microscopic and/or spectroscopic analyses of the plurality of tissue samples. However, also other types of reference measurements can be applied. Since the reference measurements can be carried out with tissue samples, i.e. not necessarily in-vivo, also imaging modalities that are not suitable for in-vivo imaging can be used for the reference measurements.

A histological analysis of the plurality of tissue samples can be performed, for example, using Hematoxylin/eosin and Safranin-O stainings to visualize and assess distinct features of the extracellular matrix. For instance, the orientation of collagen bundles can be assessed after Picrosirius red staining based on the evaluation of cartilage extracellular matrix characteristics.

A microscopic and/or spectroscopic analysis of the plurality of tissue samples can involve acquiring chemical images and/or polarized light microscopic images of the tissue samples. Chemical images are understood herein as images visualizing the distribution of different components of the tissue region of interest based on their different spectral characteristics. The different components may be understood as different tissue constituents, which might be distinguished chemically and/or physically from each other.

Chemical images can be acquired, in particular, via Fourier transform infrared microspectroscopy (FTIR-MS). Based on the absorption of infrared light by distinct molecules at characteristic frequencies, FTIR-MS combines FTIR spectrometry and conventional light microscopy to determine distinct absorption spectra in a pixel-wise manner. For instance, the amide and carbohydrate spectra provide measures of local collagen content CO and local proteoglycan content PG in a tissue sample. In an equally pixel-wise manner, collagen fibril alignment can be determined on the basis of polarized light microscopy (PLM) by measuring optical retardation as a measure of the collagen fiber orientation angle $\alpha$. Furthermore, the degree of anisotropy of the collagen fiber matrix can be measured as $a_0=1/[1+\epsilon(z)]$, where $\epsilon(z)$ is the pixel-wise local entropy of a defined image region.

In particular, the intermediate result training data can be acquired by determining, as intermediate result training data, the one or more structural properties for each of the tissue samples based on a histological, microscopic and/or spectroscopic analysis of the plurality of tissue samples and further based on a mechanical condition of the respective tissue sample, particularly a mechanical loading condition and/or deformation generated, for instance, as in the above mentioned biomechanical tests. In an embodiment, the training input data may further comprise information, for each of the images in the training input data, about the respective mechanical condition, particularly loading condition and/or deformation, of the imaged tissue sample. The test performed for determining the mechanical tissue characteristics as training output data can be performed such that mechanical conditions corresponding to the ones generated in the tissue sample for acquiring the training input data can be applied. Corresponding mechanical conditions may also be generated as in the above mentioned biomechanical tests while the tissue sample is histologically, microscopically and/or spectroscopically analyzed. It is understood that the mechanical condition of the tissue samples while being imaged for acquiring the training input data and while being histologically, microscopically and/or spectroscopically analyzed for acquiring the intermediate result training data preferably comprise the mechanical conditions of the tissue region of interest as imaged in the image provided by the providing unit.

In an example embodiment, the provided set of images correspond to quantitative magnetic resonance images (qMRI) such as T1, T1$\rho$, T2 and/or T2* maps (as derived from dedicated T1, T1$\rho$, T2 and/or T2* mapping sequences) and/or one or several photoacoustic images, wherein the one or more structural properties comprise one or more of a local collagen fiber orientation $\alpha$, a local anisotropy $a_0$, a local collagen content CO and a local proteoglycan content PG. There is a relation between the tissue information accessible via qMRI, particularly the constituents of the tissue and their distribution, and mechanical properties of the tissue, but this relation is so complex that it has not yet been found. A machine learning architecture, however, can be trained to learn this relation, thereby allowing an image-based determination of mechanical tissue characteristics.

As already mentioned above, the image data corresponding to the provided set of images is not limited to qMRI data, but could generally comprise morphologic MR image data as well as quantitative MR image data (as derived from MR studies) including, but not limited to, T1-, T1$\rho$-, T2- and/or T2*-maps, and/or other morphologic and/or quantitative MRI sequences, and/or image data of one or several photoacoustic images.

In an example embodiment, the system further comprises an assessing unit for assessing, i.e. which is adapted to assess, a state of the tissue region of interest based on the determined one or more mechanical tissue characteristics. Hence, the tissue state can be assessed automatically. In other embodiments, the tissue state can be assessed semi-automatically, wherein a user of the system can assess the tissue state based on the one or more mechanical tissue characteristics automatically determined by the system. In an example embodiment, the tissue state is assessed, i.e. by the assessing unit, for instance, based on the determined one or more mechanical tissue characteristics and an assignment of tissue states to certain ones of the mechanical tissue characteristics as determined for a plurality of tissue samples. The assignment may be established by classifying each of the plurality of tissue samples according to a given classification of tissue states. This classification may be established by professionals, such as trained clinicians, for instance. Classifying a tissue sample may involve a histological analysis of the tissue sample if the classification uses histological features of the tissue, for instance. For example, the histological analysis may involve an analysis of Haematoxylin/eosin, Safranin-O and/or Picrosirius red stainings in staining images of correspondingly prepared tissue samples. In particular, the histological analysis may be performed using Hematoxylin/eosin and Safranin-O stainings to determine the overall tissue status, wherein a grade of tissue degeneration can be assessed using the semi-quantitative Mankin classification and/or the OARSI (Osteoarthritis Research Society International) grading scheme, for instance.

The tissue whose state is to be assessed can particularly be tissue of any of cartilage, a tendon, a ligament, an artery, a liver, a brain and a heart, and the tissue state to be assessed can particularly refer to any of a degree of degeneration and/or disease of the tissue, a likelihood that the tissue develops a disease, a time span left until the onset of a disease of the tissue or an expected damage to the tissue, a More particularly, a) the tissue whose state is to be assessed can refer to cartilage (such as knee cartilage, for instance) and the tissue state to be assessed can refer to a degree of arthrosis, a likelihood of developing arthrosis or a time span left until the onset of arthrosis, or b) the tissue whose state is to be assessed can refer to a tendon or a ligament and the tissue state to be assessed can refer to a risk of severe damage (such as rupture) or a time span left until such severe damage is to be expected, or c) the tissue whose state is to be assessed can refer to damaged tissue (such as damaged tendons or ligaments) and the tissue state to be assessed can refer to a likelihood of convalescence or a time span left until convalescence, or d) the tissue whose state is to be assessed can refer to an artery and the tissue state to be assessed can refer to a risk of severe damage (such as rupture), or e) the tissue whose state is to be assessed can refer to liver tissue and the tissue state to be assessed can refer to liver cirrhosis, or f) the tissue whose state is to be assessed can refer to brain tissue and the tissue state to be assessed can refer to any brain disease, or f) the tissue whose state is to be assessed can refer to heart tissue and the tissue state to be assessed can refer to any cardiac disease.

In a further aspect, a method for determining a mechanical tissue characteristic is provided, the method comprising:
  providing a set of images of a tissue region of interest, wherein the provided set of images comprises image features indicative of one or more structural properties of the tissue region of interest and has been acquired using an imaging modality suitable for in-vivo imaging of the tissue region of interest, and
  determining, based on the provided set of images, a mechanical tissue characteristic indicative of a mechanical responsiveness of the tissue region of interest by using a machine learning architecture adapted to receive the provided set of images as an input and to provide the mechanical tissue characteristic as an output. It is understood that the method comprises the step of acquiring the images of the tissue region of interest using the imaging modality suitable for in-vivo imaging of the tissue region of interest, wherein the acquired images are then provided.

As already described above with respect to the corresponding system, the mechanical tissue characteristic is possibly determined based further on information about a respective mechanical condition, such as a mechanical loading condition and/or deformation, of the tissue region of interest in the provided set of images, wherein the machine learning architecture is possibly adapted to receive the information about the respective mechanical condition as a further input.

In a further aspect, a computer program for determining a mechanical tissue characteristic is provided, the program comprising program code means for causing the system described above to execute the method described above when the program is run on a computer controlling the system.

In a further aspect, a method of training a system as previously described, i.e. a training method, is provided, wherein the method comprises training the machine learning architecture using training data comprising a) training input data and b) training output data associated with the training input data, wherein the training data have been acquired by:
  acquiring, as training input data, images of a plurality of tissue samples, the images comprising image features indicative of one or more structural properties of the imaged tissue samples, and
  determining, preferably measuring, as training output data, the mechanical tissue characteristic for each of the tissue samples.

A corresponding training system for training the system as previously described, which can be regarded as a further aspect, is adapted to carry out the training method, wherein the training system may comprise, for training the machine learning architecture using training data comprising a) training input data and b) training output data associated with the training input data, an acquiring unit for acquiring, as training input data, images of a plurality of tissue samples, the images comprising image features indicative of one or more structural properties of the imaged tissue samples, and a determining unit for determining, as training output data, the mechanical tissue characteristic for each of the tissue samples based on the images acquired as training input data. The training system and the initially described system may be implemented using a general purpose computer, particularly on the same general purpose computer.

In further aspects, a system as initially described and trained according to the above training method, and a corresponding system, but which has not yet or only partially been trained, is provided, as well as a computer program for training a trained system as initially described and/or a corresponding untrained system, wherein the program comprises program code means for causing the respective trained, non-trained or training system to carry out the steps of the above training method when the program is run on the respective system.

It shall be understood that embodiments described can also be any combination of other embodiments. These and other aspects of will be apparent from and elucidated with reference to the embodiments described hereinafter.

Figure 1:
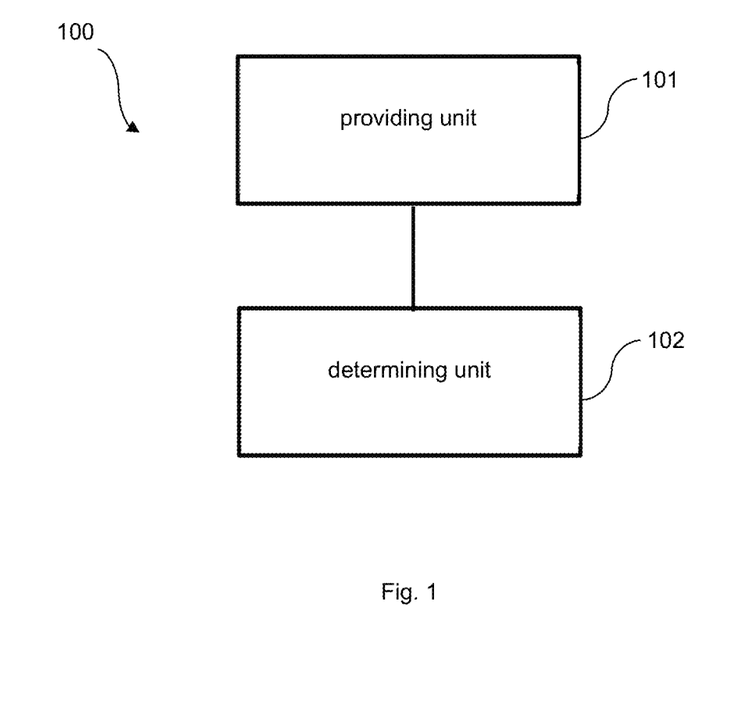
FIG. 1 shows schematically and exemplarily a system for determining a mechanical tissue characteristic.
Figure 2:
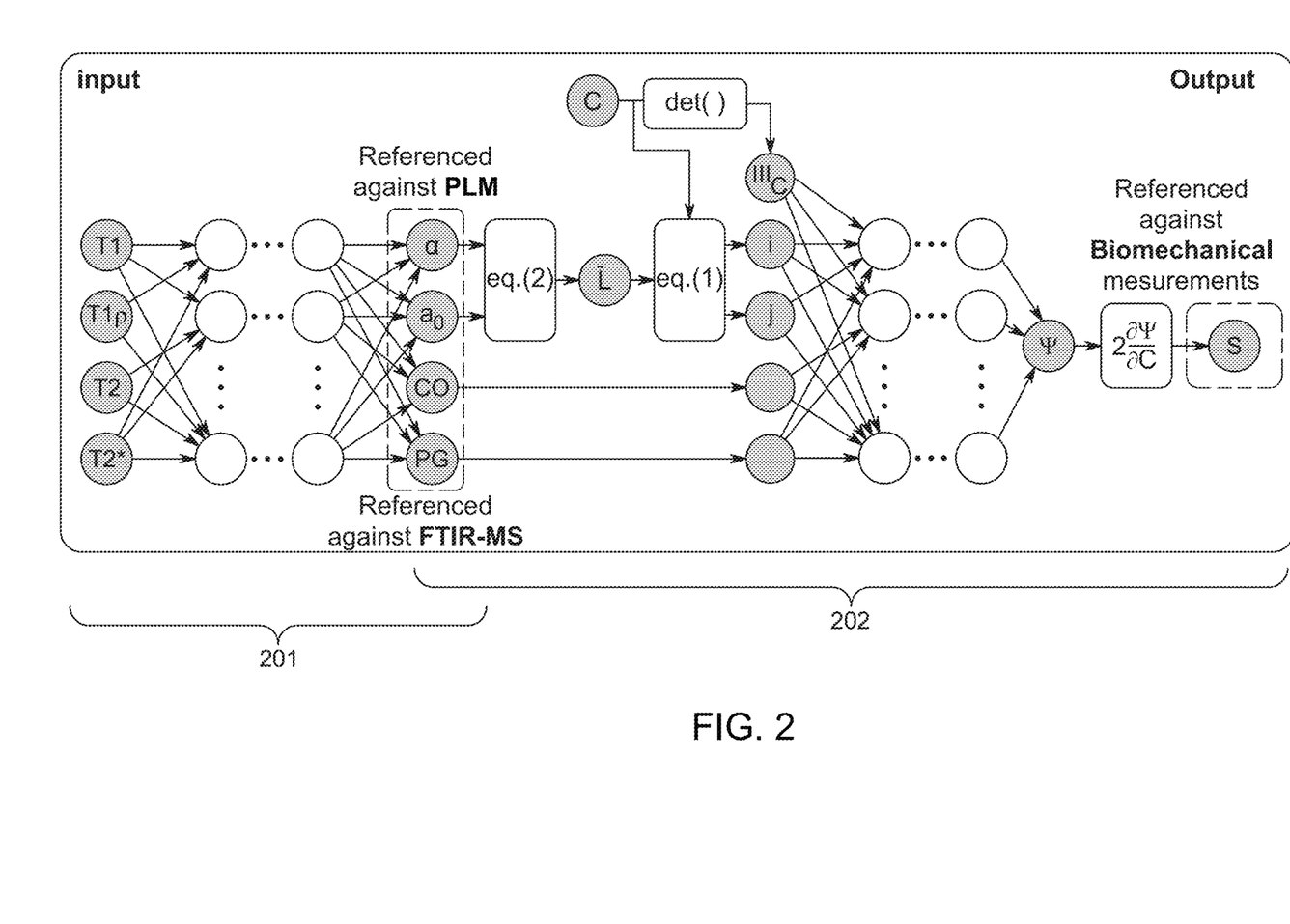
FIG. 2 shows schematically and exemplarily a machine learning architecture comprised by a determining unit of the system in an embodiment.

FIG. 1 shows schematically and exemplarily a system 100 for determining a mechanical tissue characteristic, wherein the system comprises a providing unit 101 for providing a set of images of a tissue region of interest, which may be in a certain mechanical condition comprising a loading condition and a deformation. The provided set of images has been acquired using an imaging modality suitable for in-vivo imaging of the tissue region of interest and comprises image features indicative of one or more structural properties of the tissue region of interest. The system further comprises a determining unit 102 for determining, based on the provided set of images, a mechanical tissue characteristic indicative of a mechanical responsiveness of the tissue region of interest. The determining unit 102 comprises a machine learning architecture, not separately indicated in FIG. 1, which is adapted to receive the provided set of images as an input and to provide the mechanical tissue characteristic as an output. FIG. 2 shows schematically an exemplary machine learning architecture 201, 202 that can be comprised by the determining unit 102.

As shown in FIG. 2, the machine learning architecture can comprise a first part 201 and a second part 202. The first part 201 of the machine learning architecture is adapted to receive the provided set of images as an input and to provide structural properties α,a_0,CO,PG of the tissue region of interest as an intermediate output of the machine learning architecture, which may also be regarded as an intermediate result determined by the determining unit 102. As indicated in FIG. 2, the provided set of images corresponds, in this case, to T1, T1ρ, T2 and T2* maps (as acquired using dedicated MRI sequences), and the structural properties α,a_0,CO,PG forming the intermediate result determined by the machine learning architecture correspond, in this case, to a local collagen fiber orientation, a local anisotropy, a local collagen content and a local proteoglycan content, respectively. The first part 201 of the machine learning architecture can comprise an artificial neural network as described, for instance, in the article "Machine learning-augmented and microspectroscopy-informed multiparametric MRI for the non-invasive prediction of articular cartilage composition" by K. Linka et al., *Osteoarthritis and Cartilage*, Vol. 29, issue 4, pages 592-602 (2021), particularly the section "Transfer from the imaging to the reference domain" therein. The second part 202 of the machine learning architecture is adapted to receive the intermediate output provided by the first part 201 of the machine learning architecture as an input. This input determines the behavior of the second part 202 in such a way that it can compute for every mechanical loading state C (within a certain regime of interest) an associated specific value of a function ($\Psi$) or quantity characterizing the mechanical behavior of the tissue. Thus, given the input from the first part 201 (i.e., in the illustrated case, the structural properties α,a_0,CO,PG), the second part 202 provides a mechanical characteristic that describes the mechanical behavior of the tissue not only for a specific mechanical condition but rather in a general sense for a multitude of possible mechanical conditions such as mechanical deformations.

The second part 202 of the machine learning architecture may first transform at least some of the structural properties forming the output of the first part 201 of the machine learning architecture and/or the mechanical loading state C in some manner before further processing them in a neural network. Specifically, as indicated in FIG. 2, while the local collagen content CO and the local proteoglycan content PG are fed into the neural network of the second part 202 of the machine learning architecture in an untransformed way, the local collagen fiber orientation α, the local anisotropy a_0 and the mechanical loading state C are first transformed by the second part 202 of the machine learning architecture and only then processed by the neural network of the second part 202 of the machine learning architecture. The transformation carried out by the second part 202 of the machine learning architecture on at least some of the structural properties can, for instance, comprise determining derived quantities like $\tilde{I}$, $\tilde{J}$, and III_C that are defined by some analytical relations like above equations (1) and (2) or the determinant.

The second part 202 of the machine learning architecture shown in FIG. 2 implements a nonlinear model functionally relating any mechanical deformation C of the tissue region of interest to a respective mechanical response S, and determining thereby the strain energy function $\Psi$ as a tissue characteristic. The nonlinear model implemented by the machine learning architecture, particularly its second part 202, is a hyperelastic constitutive model. The second part 202 of the machine learning architecture comprises, in the illustrated embodiment, a constitutive artificial neural network suitable for machine learning as described, for instance, in the article "Constitutive artificial neural networks: A fast and general approach to predictive data-driven constitutive modeling by deep learning" by K. Linka et al., *Journal of Computational Physics*, Vol. 429 (2021), particularly section 3 therein.

Figure 3:
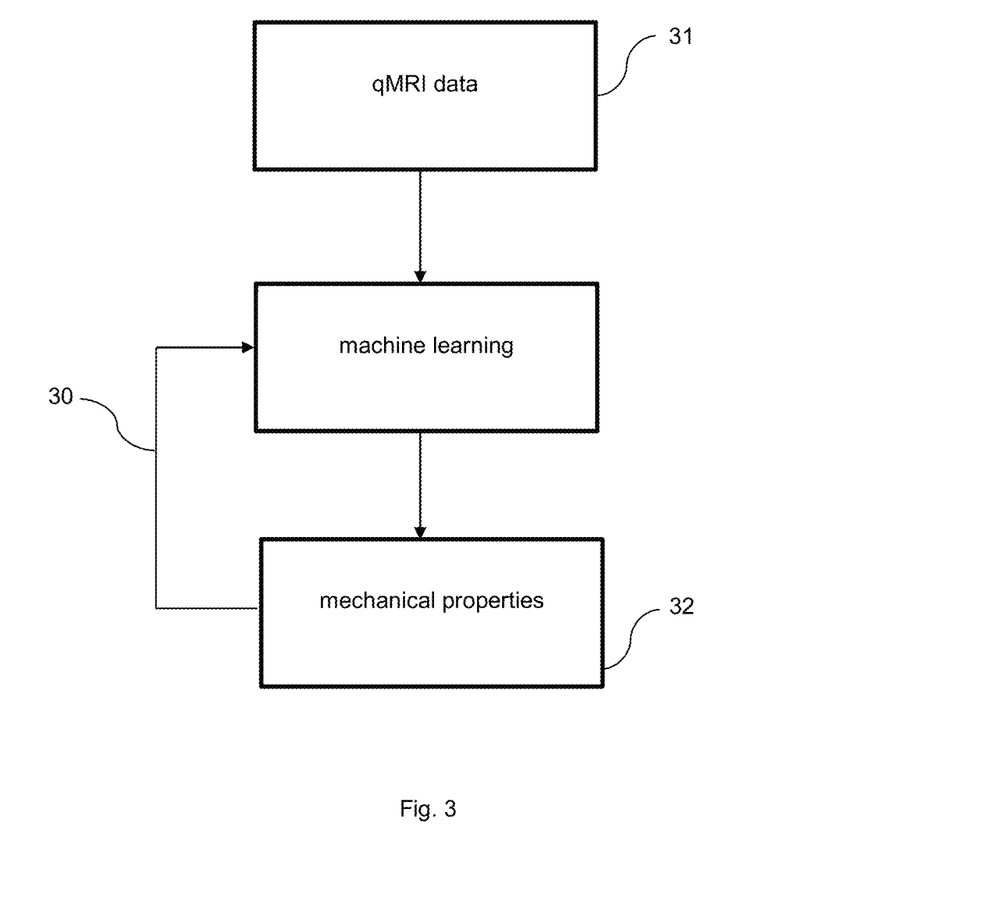
FIG. 3 shows schematically and exemplarily aspects of a method of training the system in an embodiment.

FIG. 3 shows schematically and exemplarily how the machine learning architecture comprised by the determining unit 102 can be trained using training data comprising a) training input data 31 and b) training output data 32, wherein the training output data 32 are associated with the training input data 31. As seen in FIG. 3, the training input data 31 correspond to qMR images of the tissue region of interest, wherein the training input data 31 are acquired by imaging a plurality of tissue samples, the images comprising image features indicative of one or more structural properties of the imaged tissue samples. The training output data 32 comprise, as indicated in FIG. 3, mechanical properties corresponding to a mechanical tissue characteristic of the respective tissue samples. The mechanical properties corresponding to the mechanical tissue characteristic may be measured by biomechanical tests using, for instance, stress-relaxation tests, wherein, for each of the qMR images acquired as training input data 31, a mechanical tissue characteristic of the imaged tissue sample is determined in biomechanical tests. The acquired training data 31, 32 are used for training the machine learning architecture according to a supervised machine learning scheme involving a feedback 30 based on a comparison between the output provided by the machine learning architecture for given training input data 31 and the training output data 32 associated with the training input data 31, wherein the machine learning architecture is tuned based on this feedback 30.

In some embodiments, training the machine learning architecture can comprise a training of the first part 201 of the machine learning architecture, i.e. a training of a part of the machine learning architecture that is adapted to receive a set of images of the tissue region of interest as an input and to provide one or more structural properties of the tissue region of interest as an output, wherein the one or more mechanical tissue characteristics are determined by the determining unit based on the one or more structural properties, i.e., for instance, by a further part 202 of the machine learning architecture. Training of the first part 201 of the machine learning architecture can be carried out analogously to the training of the whole machine learning architecture as illustrated by FIG. 3, wherein, instead of the final training output data 32 determined based on measurements of mechanical properties of the tissue samples and/or indicative of the respective mechanical tissue characteristic, intermediate result training data can be used. These intermediate result training data are acquired by histologically, microscopically and/or spectroscopically analyzing the respective tissue samples to determine the one or more structural properties for each of the tissue samples. In particular, for training the first part 201 of the machine learning architecture, its output, i.e. the determined structural properties α,a_0,CO,PG can be referenced against measurements obtained, for example, with Fourier transform infrared microspectroscopy (FTIR-MS) and polarized light microscopy (PLM), as also indicated in FIG. 2.

In embodiments according to which the input received by the machine learning architecture includes information about the mechanical loading state of the tissue region of interest as imaged, wherein the tissue characteristic is determined based also on this information, it is preferred that the training input data further comprise mechanical loading state training data indicating, for each of the images in the training input data, the respective mechanical loading state of the imaged tissue sample. For training the machine learning architecture as described with respect to FIG. 3, the training input data can comprise the qMR images together with information about the mechanical conditions of the imaged tissue samples. For instance, if the mechanical conditions of the tissue samples imaged for acquiring the training input data are generated by exerting a respective force, surface load and/or deformation on the tissue samples in a predefined direction, this force, surface load and/or deformation can be provided together with the respective images as training input data.

Figure 4:
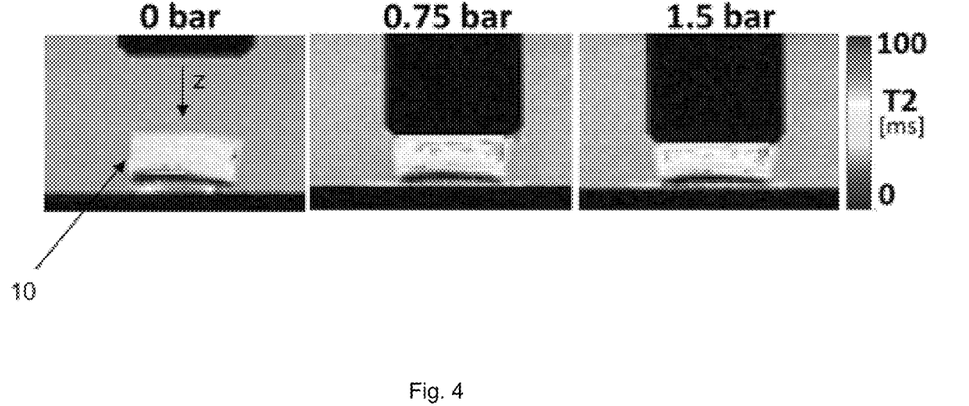
FIG. 4 shows schematically and exemplarily images of a tissue sample in different mechanical loading conditions.

FIG. 4 shows exemplary T2 maps (as calculated based on dedicated MRI sequences) acquired of an exemplary tissue sample 10, in this case knee cartilage, mounted in a piston arrangement serving as a mechanical loading device, i.e. a device for generating a specific mechanical condition. The piston arrangement allows to exert different pressures on the tissue sample, wherein the pressures are exerted by the piston acting on the tissue sample along an axial direction z. With pressure increasing from left to right in FIG. 4, the tissue sample is increasingly compressed, wherein also the T2 maps change. MRI data like these, optionally including also information about the mechanical condition, particularly mechanical loading condition and/or deformation, corresponding to the pressure exerted by the piston, can be used as training input data for training the machine learning data.

Figure 5:
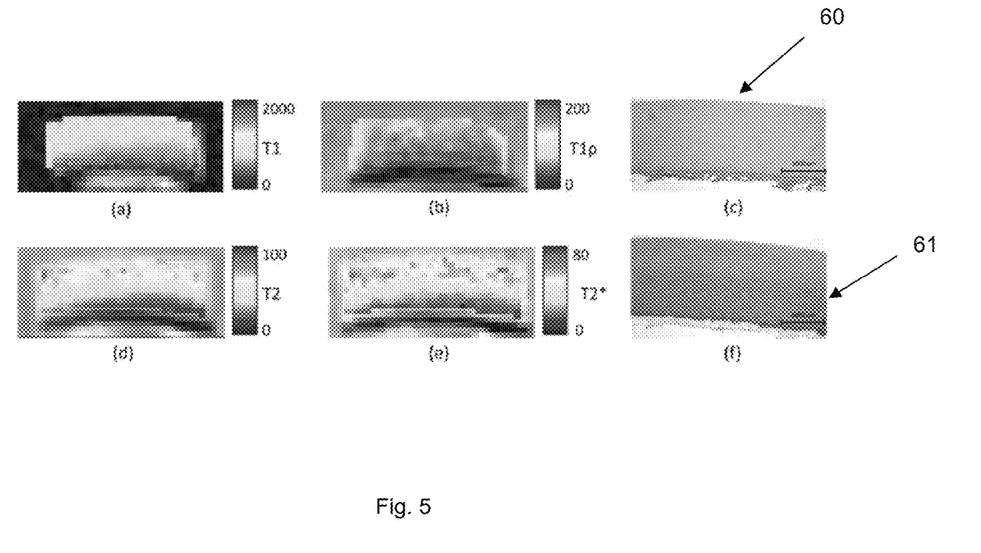

FIGS. 5(a), 5(b), 5(d) and 5(e) show further exemplary MR images acquired of an exemplary tissue sample that could be used as training input data, wherein it is understood that these types of MR images could then preferably also be provided by the providing unit for the tissue region of interest whose mechanical tissue characteristic is to be determined. FIG. 5(a) shows a T1 map, FIG. 5(b) shows a T1ρ map, FIG. 5(d) shows a T2 map, and FIG. 5(e) shows a T2* map of the tissue sample, wherein the corresponding pixel value scales refers to units of ms. These maps were acquired using dedicated MRI sequences. Not shown, but one of several other types of images that could be used for determining the mechanical tissue characteristic and for the corresponding training, are photoacoustic images.

FIGS. 5(c) and 5(f) show exemplary histological stainings 60, 61 of the tissue sample. Such stainings are used for a histological analysis of the tissue sample. They can be generated using Haematoxylin-eosin, Safranin-O or Picrosirius red as a staining substance, for instance. Staining images 60, 61 as exemplary shown in FIGS. 5(c) and 5(f) can be used to determine structural properties of the imaged tissue, such as the orientation of collagen bundles. The determined structural properties can then be used as intermediate result training data for training the machine learning architecture, particularly as a reference for the intermediate result that can be provided as an intermediate output by the first part 201 of the machine learning architecture as shown in FIG. 2.

A histological analysis using images like those shown in FIG. FIGS. 5(c) and 5(f) can also be carried out in order to assess a clinical state of the imaged tissue. For instance, a degree of tissue degeneration can be determined according to the Mankin classification and the Osteoarthritis Research Society International (OARSI) grading scheme. The tissue states determined in such an assessment of tissue samples may be assigned to the tissue characteristics measured for the respective tissue samples for acquiring the training output data, wherein this assignment can serve as a reference for an automated assessment of tissue states. For instance, the system may comprise an assessing unit for assessing the state of the tissue region of interest based on the determined mechanical tissue characteristic, wherein the assessing unit can be adapted to assess the tissue state based further on the assignment of tissue states to mechanical tissue characteristics determined for the tissue samples. The assessing unit can comprise a further machine learning architecture adapted to receive mechanical tissue characteristics as an input and to provide tissue states as an output, wherein the machine learning architecture may be trained based on the assignment of tissue states to mechanical tissue characteristics established from the tissue samples. The machine learning architecture comprised by the determining unit may also comprise a further part adapted to receive mechanical tissue characteristics as an input and to provide tissue states as output, wherein the further part may be trained based on the assignment of tissue states to mechanical tissue characteristics established from the tissue samples.

Figure 6:
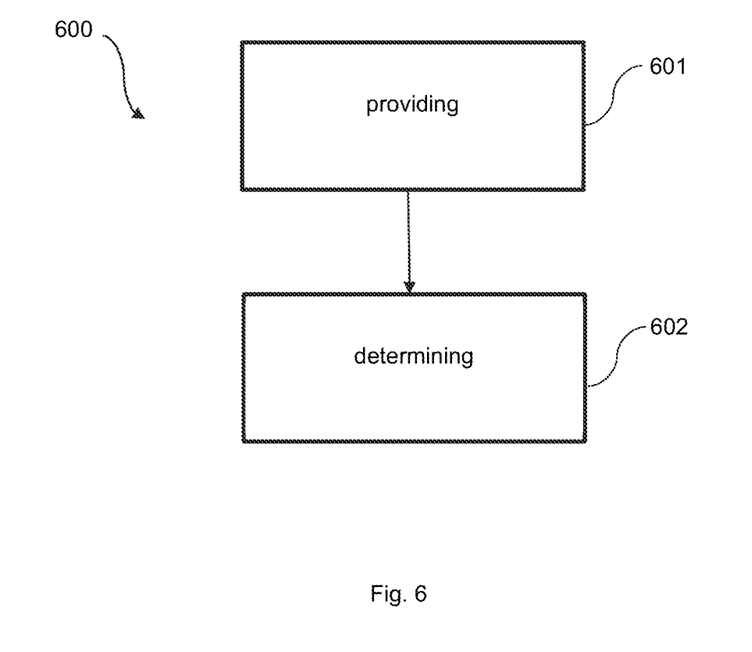
FIG. 6 shows schematically and exemplarily a method for determining a mechanical tissue characteristic.

FIG. 6 shows schematically and exemplarily a method 600 for determining a mechanical tissue characteristic, the method comprising a first step 601 of providing a set of images of a tissue region of interest, wherein the provided set of images comprises image features indicative of one or more structural properties of the tissue region of interest, and a second step 602 of determining, based on the provided set of images, a mechanical tissue characteristic indicative of a mechanical responsiveness of the tissue region of interest by using a machine learning architecture adapted to receive the provided set of images as an input and to provide the mechanical tissue characteristic ($\Psi$) as an output. The method can be carried out by a computer program running on a system as described above, for instance.

Other variations to the disclosed embodiments can be understood and effected by those skilled in the art in practicing the present disclosure, from a study of the drawings, the disclosure, and the appended claims.

The term "image" as used herein is not limited to an actual visual representation of the imaged object, such as the tissue region of interest. Instead, an "image" as referred to herein can be generally understood as a representation of the imaged object in terms of data acquired by imaging the object, wherein "imaging" can refer to any process involving an interaction of electromagnetic waves, particularly light or radiation, with the object and a subsequent capturing of the electromagnetic waves. In particular, the term "image" as used herein can refer to image data based on which an actual visual representation of the imaged object can be constructed. For instance, the image data can correspond to an assignment of color or grayscale values to image positions, wherein each image position corresponds to a position in or on the imaged object. The images or image data referred to herein can be two-dimensional, three-dimensional or four-dimensional, for instance, wherein a four-dimensional image is understood as a three-dimensional image evolving over time.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage. Procedures like the providing of a set of images, the determining of a mechanical tissue characteristic, et cetera, performed by one or several units or devices can be performed by any other number of units or devices. These procedures can be implemented as program code means of a computer program and/or as dedicated hardware. A computer program product may be stored/ distributed on a suitable medium, such as an optical storage medium or a solid-state medium, supplied together with or as part of other hardware, but may also be distributed in other forms, such as via the Internet or other wired or wireless telecommunication systems.

Osteoarthritis in the knee, or knee arthrosis, results from a degeneration of the knee cartilage and is among the most frequent orthopedic diseases worldwide, with an estimated 30 million patients in the USA alone. By an early diagnosis and with suitable counter measures, the progression of the disease can be slowed down substantially or even stopped for an extended period of time. It has been found that one of the most reliable indicators for an early knee arthrosis is the change in mechanical properties of the knee cartilage, specifically its softening. More generally, the mechanical properties of soft tissue have been found to be of great medical significance in many cases. For instance, for cartilage in general they have been found to be an important early indicator of degenerative joint diseases like arthrosis. On the other hand, mechanical properties of soft tissue can yield information about a progress of recovery after an injury, such as an injury of a tendon or ligament, for instance. More generally, for patients under heavy physical stress, such as professional and other top athletes, this information allows to estimate the fitness for competition or a time likely to be remaining until the end of the athletic or professional career.

Means are presented herein for non-invasively measuring mechanical properties of biological soft tissue and assessing its state, particularly for non-invasively diagnosing osteoarthritis at an early stage, specifically knee osteoarthritis. For this purpose, quantitative magnetic resonance imaging (qMRI) data are related to data acquired in mechanical tests via machine learning. In this way, means are obtained that allow to determine mechanical properties from qMRI data in a non-invasive manner.

Quantitative magnetic resonance imaging allows to quantify different tissue compositions in biological soft tissue like knee cartilage, for instance, by employing different relaxation times and different MRI sequences. By slicing a three-dimensional volume into image slices, the determination of the different tissue compositions can be achieved in a spatially resolved manner, which allows to create precise spatial images even of heterogeneous tissue regions. Yet more information about the imaged tissue can be obtained by acquiring qMRI data not only in mechanically unloaded states, but also when a mechanical load is applied to the tissue, which is compatible with qMRI scanning.

Mechanical properties of biological tissue like knee cartilage can be determined by performing mechanical tests, such as compression or tension tests. These tests can be carried out simultaneously to qMRI scanning (in situ), in order to arrive at a direct comparison between qMR images and the simultaneously measured mechanical properties of the tissue.

Given sufficient amounts of data, machine learning allows to discover relations that have not yet been identifiable for humans or for which humans have not yet been able to find a clear description. In some embodiments, therefore, supervised machine learning is used on the basis of artificial neural networks. For this purpose, training data are provided which relate, for a plurality of tissue samples, qMRI data (as input data) to mechanical properties and/or characteristics determined in mechanical tests (as output data). These training data are provided to a particular machine learning architecture, wherein the machine learning architecture learns, from the training data, to determine mechanical tissue properties and/or characteristics from qMRI data (non-invasively). The particular machine learning architecture used according to embodiments described herein comprises one or more artificial neural networks which are combined, inter alia, with analytic equations from materials theory and continuum mechanics, as well as, optionally, from other areas or physics, medicine or any other branch of science. This specific machine learning architecture is able to learn the relation between qMRI data and mechanical tissue properties on the basis of a particularly small set of training data, which makes the training more efficient. Moreover, this kind of machine learning architecture is particularly capable of arriving at physically sensible results with high probability even in special cases, such as in cases where the input data lie at the edge or even outside of the training data. It has already been found by the inventors in a pre-clinical study that structural tissue properties, specifically the tissue composition, of cartilage, particularly knee cartilage can be determined non-invasively from qMRI data using one or more artificial neural networks. However, for clinical applications, it is of particular interest to not only acquire information about structural tissue properties, particularly the tissue composition, but also mechanical tissue properties and/or characteristics from the qMRI data.

The above description and embodiments relate to a system for determining a mechanical tissue characteristic, the system comprising a providing unit for providing a set of images of a tissue region of interest, wherein the provided set of images comprises image features indicative of one or more structural properties of the tissue region of interest. The system further comprises a determining unit for determining, based on the provided set of images, a mechanical tissue characteristic indicative of a mechanical responsiveness of the tissue region of interest, wherein the determining unit comprises a machine learning architecture adapted to receive the provided set of images as an input and to provide the mechanical tissue characteristic as an output.

All of the above U.S. patents, U.S. patent application publications, U.S. patent applications, foreign patents, foreign patent applications and non-patent publications referred to in this specification and/or listed in the Application Data Sheet, are incorporated herein by reference, in their entireties.

From the foregoing it will be appreciated that, although specific embodiments have been described herein for purposes of illustration, various modifications may be made without deviating from the spirit and scope of the invention. For example, the methods and systems discussed herein are applicable to other architectures. Also, the methods and systems discussed herein are applicable to differing <protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A system for determining a mechanical tissue characteristic ($\Psi$), the system comprising:

a providing unit structured to provide a set of images of a tissue region of interest, wherein the provided set of images comprises image features indicative of one or more structural properties ($\alpha$, $a_0$, CO, PG) of the tissue region of interest and has been acquired using an imaging modality suitable for in-vivo imaging of the tissue region of interest; and a determining unit structured to determine, based on the provided set of images, a mechanical tissue characteristic ($\Psi$) indicative of a mechanical responsiveness of the tissue region of interest, wherein the determining unit comprises a machine learning architecture adapted to receive the provided set of images as an input and to provide the mechanical tissue characteristic ($\Psi$) as an output.

2. The system of claim 1 wherein the determining unit is configured to determine, based on the provided set of images, the one or more structural properties ($\alpha$, $a_0$, CO, PG) of the tissue region of interest as an intermediate result provided by the machine learning architecture, and to determine the mechanical tissue characteristic ($\Psi$) based on the one or more structural properties ($\alpha$, $a_0$, CO, PG).

3. The system of claim 1 wherein the machine learning architecture is configured to receive, as a further input, information about a respective mechanical condition (C) of the tissue region of interest in the provided set of images, wherein the determining unit is adapted to determine the mechanical tissue characteristic ($\Psi$) based further on this information.

4. The system of claim 3 wherein the respective mechanical condition (C) is represented in terms of the Cauchy-Green deformation tensor C and the mechanical tissue characteristic ($\Psi$) is represented in terms of a strain energy function $\Psi$ or any quantity that can directly be derived from it.

5. The system of claim 1 wherein the machine learning architecture implements a nonlinear model functionally relating at least a part of its input to its output.

6. The system of claim 5 wherein the nonlinear model implemented by the machine learning architecture) is a mechanical constitutive model relating mechanical strain and mechanical stress to each other.

7. The system of claim 1 wherein the machine learning architecture comprises a constitutive artificial neural network suitable for machine learning.

8. The system of claim 1 wherein the machine learning architecture has been trained using training data comprising a) training input data and b) training output data associated with the training input data, and wherein the training data have been acquired by acquiring, as training input data, images of a plurality of tissue samples, the images comprising image features indicative of one or more structural properties ($\alpha$, $a_0$, CO, PG) of the imaged tissue samples and determining, as training output data, the mechanical tissue characteristic ($\Psi$) for each of the tissue samples.

9. The system of claim 8 wherein the training data further comprise intermediate result training data acquired by determining, as intermediate result training data, the one or more structural properties ($\alpha$, $a_0$, CO, PG) for each of the tissue samples, based on reference evaluations of the structural properties ($\alpha$, $a_0$, CO, PG) of the tissue samples.

10. The system of claim 8 wherein the training input data further comprise, for each of the images in the training input data, information about the respective mechanical condition (C) of the imaged tissue sample.

11. The system of claim 1 wherein the provided set of images corresponds to morphologic MR image data, quantitative MR image data, photoacoustic image data, and wherein the one or more structural properties ($\alpha$, $a_0$, CO, PG) comprise one or more of a local collagen fiber orientation $\alpha$, a local anisotropy $a_0$, a local collagen content CO and a local proteoglycan content PG.

12. The system of claim 1, further comprising: an assessing unit for assessing a state of the tissue region of interest based on the determined mechanical tissue characteristic ($\Psi$).

13. A method for determining a mechanical tissue characteristic ($\Psi$), the method comprising:
providing a set of images of a tissue region of interest, wherein the provided set of images comprises image features indicative of one or more structural properties ($\alpha$, $a_0$, CO, PG) of the tissue region of interest and has been acquired using an imaging modality suitable for in-vivo imaging of the tissue region of interest; and
determining, based on the provided set of images, a mechanical tissue characteristic ($\Psi$) indicative of a mechanical responsiveness of the tissue region of interest by using a machine learning architecture configured to receive the provided set of images as an input and to provide the mechanical tissue characteristic ($\Psi$) as an output.

14. A computer-readable storage medium containing computer program instructions for controlling a computer processor in a system, the system having a providing unit structured to provide a set of images comprising image features indicative of one or more structural properties ($\alpha$, $a_0$, CO, PG) of the tissue region of interest, to determine a mechanical tissue characteristic ($\Psi$) by performing a method comprising:
training a machine learning architecture adapted to receive a provided set of images as an input and to provide the mechanical tissue characteristic ($\Psi$) as an output using training data comprising a) training input data and b) training output data associated with the training input data; and
wherein the training data have been acquired by:
acquiring, as training input data, images of a plurality of tissue samples, the images comprising image features indicative of one or more structural properties ($\alpha$, $a_0$, CO, PG) of the imaged tissue samples; and
determining, as training output data, the mechanical tissue characteristic ($\Psi$) for each of the tissue samples.

* * * * *